United States Patent
Kim et al.

(10) Patent No.: US 9,263,902 B2
(45) Date of Patent: Feb. 16, 2016

(54) BATTERY MANAGEMENT SYSTEM AND BATTERY PACK HAVING THE SAME

(71) Applicant: Samsung SDI Co., Ltd., Yongin-si, Gyeonggi-do (KR)

(72) Inventors: Bongyoung Kim, Yongin-si (KR); Kiho Shin, Yongin-si (KR); Chihyung Ahn, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 245 days.

(21) Appl. No.: 13/966,196

(22) Filed: Aug. 13, 2013

(65) Prior Publication Data

US 2014/0203736 A1  Jul. 24, 2014

(30) Foreign Application Priority Data

Jan. 22, 2013  (KR) .................. 10-2013-0007101

(51) Int. Cl.
| H02P 1/00 | (2006.01) |
|---|---|
| H02J 7/00 | (2006.01) |
| H02P 7/00 | (2006.01) |
| H02P 31/00 | (2006.01) |

(52) U.S. Cl.
CPC ............. *H02J 7/0029* (2013.01); *H02J 7/0034* (2013.01); *H02P 7/00* (2013.01); *H02J 2007/0067* (2013.01); *H02P 31/00* (2013.01)

(58) Field of Classification Search
CPC ............. H01M 10/44; H01M 2010/4271; H02J 1/00; H02J 7/1045; H02J 7/0054; H02J 7/00; Y02T 10/7005; Y02T 10/7044

USPC .......................... 318/139; 320/116, 127, 135
See application file for complete search history.

(56) References Cited

U.S. PATENT DOCUMENTS

| 5,880,575 | A | * | 3/1999 | Itou et al. ...................... 320/122 |
|---|---|---|---|---|
| 6,054,840 | A | * | 4/2000 | Nakanishi et al. ............. 320/118 |
| 6,304,061 | B1 | * | 10/2001 | Toya .............................. 320/134 |
| 7,489,110 | B2 | * | 2/2009 | Stanesti et al. ................ 320/135 |
| 2002/0195994 | A1 | * | 12/2002 | Perelle .......................... 320/116 |
| 2006/0197505 | A1 | | 9/2006 | Park et al. |
| 2009/0146614 | A1 | * | 6/2009 | Carrier et al. ................. 320/152 |
| 2010/0052615 | A1 | * | 3/2010 | Loncarevic .................... 320/118 |
| 2011/0001442 | A1 | * | 1/2011 | Lee et al. ....................... 318/139 |

FOREIGN PATENT DOCUMENTS

| JP | 2005-204365 A | 7/2005 |
|---|---|---|
| KR | 10-0685449 B1 | 2/2007 |
| KR | 10-0762086 B1 | 9/2007 |

* cited by examiner

*Primary Examiner* — Rina Duda
(74) *Attorney, Agent, or Firm* — Knobbe, Martens, Olson & Bear LLP

(57) ABSTRACT

A battery management system and a battery pack having the same including a charging circuit path for charging a battery and a discharging circuit path for discharging the battery is disclosed. The battery pack also includes a controller configured to control a charge switch unit in the charging circuit path during charging and to compensate for a change in voltage across the battery during discharging by controlling a discharge switch unit in the discharging circuit path to supply substantially constant power to an output terminal unit.

18 Claims, 4 Drawing Sheets

BATTERY MANAGEMENT SYSTEM AND BATTERY PACK HAVING THE SAME

CROSS-REFERENCE TO RELATED APPLICATIONS

This application claims priority to and the benefit of Korean Patent Application No. 10-2013-0007101, filed on Jan. 22, 2013, the entire content of which is incorporated herein by reference.

BACKGROUND

1. Field

The disclosed technology relate to a battery management system and a battery pack having the same.

2. Description of the Related Technology

Secondary or exchangeable batteries are widely used as power sources of portable electronic devices, such as cellular phones, notebook computers, camcorders, or personal digital assistants (PDAs), or motors for electric tools or wireless cleaners.

Some secondary batteries are fabricated in the form of battery packs including battery cells and a battery management system, and the battery cells are charged or discharged using an external power source or an external load connected to an external terminal installed in the battery pack. The battery management system may measure voltage and current levels of the battery cells, and may control protecting operations of the battery cells based on the measured voltage and current levels.

With recent diversification of applications for battery management systems, the demand for battery management systems additionally equipped with various functions in addition to functions of the existing battery management systems has increased. Accordingly, there is a need to develop a battery pack having these new additional functions.

SUMMARY OF CERTAIN INVENTIVE ASPECTS

Aspects of the present invention provide a battery management system and a battery pack having the same, which can be controlled by an electric motor and has a reduced manufacturing cost.

A battery management system according to one embodiment includes a charge/discharge circuit electrically connected to a battery and comprising a charging circuit path, a discharging circuit path, and a common circuit path shared by the charging circuit path and the discharging circuit path. The battery management system additionally includes an output terminal unit including a positive terminal and a negative terminal in the discharging circuit path where the positive terminal and the negative terminal are electrically connected to each other through an electric motor. The battery management system additionally includes a discharge switch unit in the discharging circuit path and configured to control a current flow through the discharging circuit path by open-circuiting or short-circuiting the discharging circuit path. The battery management system additionally includes a charge switch unit in the charging circuit path and configured to control a current flow through the charging circuit path by open-circuiting or close-circuiting the charging circuit path. The battery management system additionally includes a first resistor in the common circuit path, and a controller configured to detect a voltage across the battery and to detect a current flow through the first resistor during charging and discharging of the battery by controlling the discharge switch unit and the charge switch unit.

According to one aspect of the battery management system, the controller of the battery management system is configured to control the discharge switch unit to short-circuit the discharging circuit path and to control the charge switch unit to open-circuit the charging circuit path during discharging, and configured to control the discharge switch unit to open-circuit the discharging circuit path and to control the charge switch unit to short-circuit the charging circuit path during charging.

According to another aspect, the controller of the battery management system is configured to control an amount of the current flowing through the first resistor in response to a change (e.g., a reduction) in the voltage across the battery by controlling a pulse width modulation (PWM) duty ratio of the discharge switch unit to supply a substantially constant amount of power to the electric motor.

According to another aspect, the first resistor may include a shunt resistor.

According to another aspect, the discharging circuit path may include a first discharging circuit path and a second discharging circuit path, and the output terminal unit may include a first output terminal unit including a first positive terminal and a first negative terminal in the first discharging circuit path and a second output terminal unit including a second positive terminal and a second negative terminal in the second discharging circuit path.

According to another aspect, the discharge switch unit may include a first discharge switch unit in the first discharging circuit path, and a second discharge switch unit in the second discharging circuit path.

According to another aspect, the first resistor may be connected between the first discharge switch unit and a negative electrode terminal of the battery, and the battery management system may further comprise a second resistor electrically connected between the second discharge switch and the negative electrode terminal of the battery.

According to another aspect, the controller is configured to control an amount of the current flow through the second resistor in response to a change (e.g., a reduction) in the voltage across the battery by controlling a pulse width modulation (PWM) duty ratio of the second discharge switch unit to supply a substantially constant amount of power to the electric motor.

According to another aspect, the second resistor includes a field effect transistor (FET) configured to operate as a shunt resistor across a channel between a source and a drain and controlled by a gate, where the gate is controlled by the controller.

According to another aspect, the battery management system further includes a first charge terminal (e.g., a positive charge terminal) and a second charge terminal (e.g., a negative charge terminal). Here, a connection node of the first discharge switch unit and the first resistor is connected to the second charge terminal through the charge switch unit.

According to another aspect, the battery management system may further include at least one voltage drop diode connected between the first charge terminal and a positive electrode terminal of the battery and forward-biased to supply a rated voltage to the battery by a predetermined voltage drop during charging of the battery.

According to another aspect, the battery management system may further include a reverse current preventing diode connected between the second charge terminal and the first resistor. The reverse current preventing diode is configured such that when a current flows in a direction from the second charge terminal to the negative electrode terminal, the reverse current preventing diode is reverse-biased to prevent a substantial current flow through the first resistor and the battery.

A battery pack according to one embodiment includes a battery unit including a plurality of batteries, and a charge/discharge circuit electrically connected to the battery unit and comprising a charging circuit path, a discharging circuit path, and a common circuit path shared by the charging circuit path and the discharging circuit path. The battery pack additionally includes an output terminal unit including a positive terminal and a negative terminal in the discharging circuit path where the positive terminal and the negative terminal are electrically connected to each other through an electric motor. The battery pack additionally includes a discharge switch unit in the discharging circuit path and configured to control a current flow through the discharging circuit path by open-circuiting or short-circuiting the discharging circuit path. The battery pack additionally includes a charge switch unit in the charging circuit path and configured to control a current flow through the charging circuit path by open-circuiting or close-circuiting the charging circuit path. The battery pack additionally includes a first resistor in the common circuit path, and a controller configured to detect a voltage across the battery unit and to detect a current flow through the first resistor during charging and discharging of the battery unit by controlling the discharge switch unit and the charge switch unit.

According to one aspect of the battery pack, the controller is configured to control the discharge switch unit to short-circuit the discharging circuit path and to control the charge switch unit to open-circuit the charging circuit path during discharging, and configured to control the discharge switch unit to open-circuit the discharging circuit path and to control the charge switch unit to short-circuit the charging circuit path during charging According to another aspect, the controller is configured to control an amount of the current flowing through the first resistor in response to a change (e.g., a reduction) in the voltage across the battery by controlling a pulse width modulation (PWM) duty ratio of the discharge switch unit to supply a substantially constant amount of power to the electric motor.

According to another aspect, the first resistor may include a shunt resistor.

According to another aspect, the discharging circuit path may include a first discharging circuit path and a second discharging circuit path, and the output terminal unit may include a first output terminal unit including a first positive terminal and a first negative terminal in the first discharging circuit path and a second output terminal unit including a second positive terminal and a second negative terminal in the second discharging circuit path.

According to another aspect, the discharge switch unit may include a first discharge switch unit in the first discharging circuit path, and a second discharge switch unit in the second discharging circuit path.

According to another aspect, the first resistor may be connected between the first discharge switch unit and a negative electrode terminal of the battery unit, and the battery pack may further comprises a second resistor electrically connected between the second discharge switch and the negative electrode terminal of the battery unit.

According to another aspect, the controller configured to control an amount of the current flow through the second resistor in response to a change (e.g., a reduction) in the voltage across the battery unit by controlling a pulse width modulation (PWM) duty ratio of the second discharge switch unit to supply a substantially constant amount of power to the electric motor.

According to another aspect, the second resistor includes a field effect transistor (FET) configured to operate as a shunt resistor across a channel between a source and a drain and controlled by a gate, where the gate is controlled by the controller.

According to another aspect, the battery pack further includes a first charge terminal (e.g., a negative charge terminal) and a second charge terminal (e.g., a positive charge terminal), wherein a connection node of the first discharge switch unit and the first resistor is connected to the second charge terminal through the charge switch unit.

According to another aspect, the battery pack may further include at least one voltage drop diode connected between the first charge terminal and a positive electrode terminal of the battery unit and forward-biased to supply a rated voltage to the battery unit by a predetermined voltage drop during charging of the battery.

According to another aspect, the battery pack may further include a reverse current preventing diode connected between the second charge terminal and the first resistor. The reverse current preventing diode is configured such that when a current flows in a direction from the second charge terminal to the negative electrode terminal, the reverse current preventing diode is reverse-biased to prevent a substantial current flow through the first resistor and the battery unit.

As described above, the battery management system according to the present invention and the battery pack having the same can be controlled by an electric motor and has a reduced manufacturing cost.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF CERTAIN INVENTIVE EMBODIMENTS

A preferred example embodiment of the present invention will now be described in more detail with reference to accompanying drawings, such that those skilled in the art can easily practice the present invention.

Hereinafter, a configuration of a battery pack 100 according to an embodiment of the present invention will be described.

Figure 1:
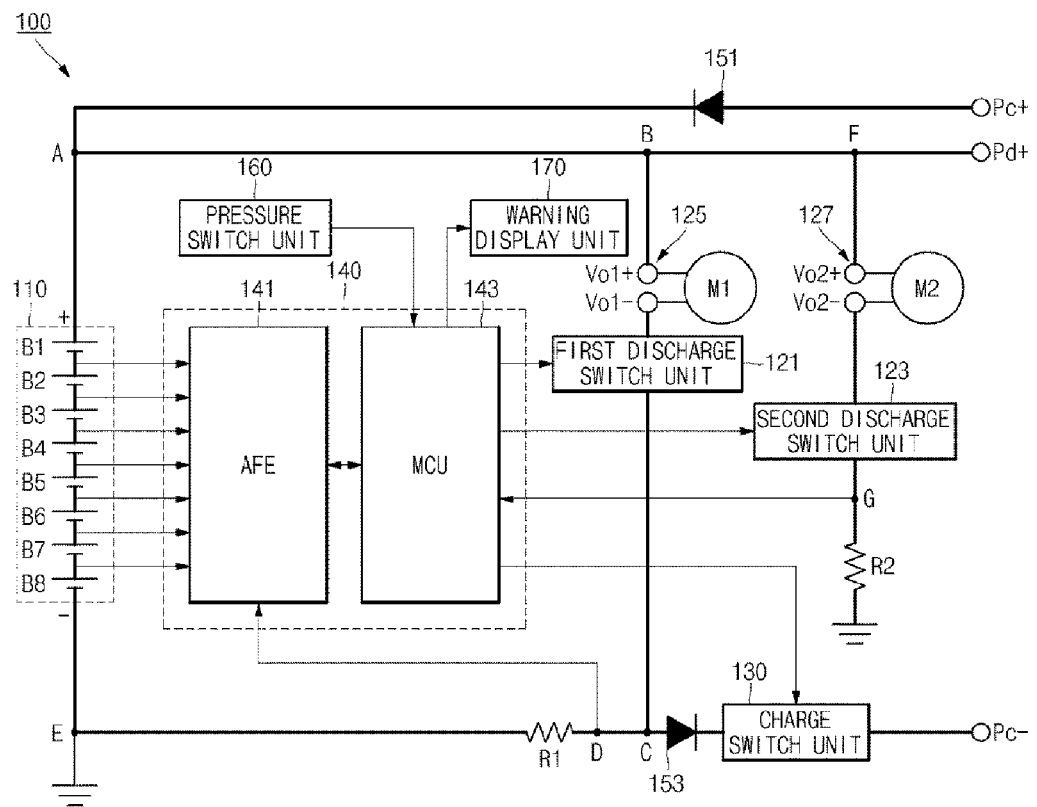
FIGS. 1 and 2 are circuit views of a battery pack according to an embodiment of the present invention.

FIG. 1 is a circuit view of a battery pack 100 according to an embodiment of the present invention.

FIG. 1 illustrates the battery pack 100 according to an embodiment of the present invention including a battery unit 110, a charge/discharge circuit, an output terminal unit including a first output terminal unit 125 and a second output terminal unit 127, first and second discharge switch units 121 and 123, a charge switch unit 130, a first resistor R1, a second resistor R2 and a controller 140. The battery pack 100 may further include a voltage drop diode 151, a reverse current preventing diode 153, a pressure switch unit 160 and a warning display unit 170.

FIG. 1 also illustrates a battery management system according to an embodiment of the present invention, including the charge/discharge circuit, the output terminal unit including first and second output terminal units 125 and 127, first and second discharge switch units 121 and 123, the charge switch unit 130, the first resistor R1, the second resistor R2, the controller 140, the voltage drop diode 151, the pressure switch unit 160 and the warning display unit 170, and excluding the battery unit 110 from various components of the battery pack 100.

In various embodiments, the battery unit 110 includes one or more chargeable/dischargeable battery cells. While the exemplary battery unit 110 of FIG. 1 includes 8 battery cells B1-B8 connected to each other in series, aspects of the present invention are not limited thereto. A person skilled in the art will understand that the battery unit 110 can include an appropriate number of chargeable/dischargeable battery cells according to the battery pack 100 and can be configured in series connection, parallel connection, or a combination of series and parallel connections.

The charge/discharge circuit is electrically connected to the battery unit 110 and can include a high current path through which charging current and discharging current can flow during charging and discharging of the battery unit 110. According to one embodiment, the charge/discharge circuit includes a charging circuit path, a discharging circuit path, and a common circuit path.

In one aspect, the charging circuit path includes a circuit path from a positive electrode charge terminal Pc+ of the battery pack 100 to a negative electrode charge terminal P− of the battery pack 100 through nodes A, E, D, and C.

In another aspect, the discharging circuit path includes a first discharging circuit path and a second discharging circuit path. The first discharging circuit path includes circuit paths from a positive electrode terminal B1+ of the battery unit 110 to a negative electrode terminal B8− of the battery unit 110 through nodes A, B, C, D and E. The node E may be connected to ground. The second discharging circuit path includes a circuit path from the positive electrode terminal B1+ of the battery unit 110 to the negative electrode terminal B8− of the battery unit 110 through nodes A, B, F, G and E. The node G may be connected to node E through a common ground.

The common circuit path may be a common section shared by the charging circuit path and the first discharging circuit path, through which a charging current flows during charging of the battery unit 110 and a discharging current flows during discharging of the battery unit 110. Referring to FIG. 1, the common circuit path includes circuit paths from the node C to the negative electrode terminal B8− of the battery unit 110 through nodes D and E.

In one aspect, the output terminal unit can include the first output terminal unit 125 and the second output units 127, and may correspond to a discharge terminal of the battery pack 100.

In another aspect, the first output terminal unit 125 includes a first positive terminal Vo1+ and a first negative terminal Vo1−. The first output terminal unit 125 is included in the first discharging circuit path. In particular, the first output terminal unit can be connected between the node B and the first discharge switch unit 121. In addition, the first positive and negative terminals Vo1+ and Vo1− may be electrically connected to each other through a first electric motor M1 and may output power to the first electric motor M1 during discharging of the battery unit 110.

In another aspect, the second output terminal unit 127 includes a second positive electrode output terminal Vo2+ and a second negative electrode output terminal Vo2−. The second output terminal unit 127 is included in the second discharging circuit path. In particular, the second output terminal unit 127 can be connected between the node F and the second discharge switch unit 123. In addition, the second positive and negative terminals Vo2+ and Vo2− may be electrically connected to each other through a second electric motor M2 and may output power to the second electric motor M2 during discharging of the battery unit 110.

In another aspect, since the first electric motor M1 is connected to the first discharging circuit path having the common circuit path, the first electric motor M1 can preferably be configured as a main electric motor and the second electric motor M2 can preferably be configured as a sub electric motor, which will later be described in more detail.

In one aspect, the first discharge switch unit 121 is included in the first discharging circuit path. In particular, the first discharge switch unit 121 is connected between the first output terminal unit 125 and the node E. In some embodiments, the first discharge switch unit 121 includes a metal oxide silicon field effect transistor (MOSFET) and is controlled by the controller 140 to open or close the first discharging circuit path.

In another aspect, the second discharge switch unit 123 is included in the second discharging circuit path. In particular, the second discharge switch unit 123 is connected between the second output terminal unit 127 and the node G. In some embodiments, the second discharge switch unit 123 includes a metal oxide silicon field effect transistor (MOSFET) and is controlled by the controller 140 to open or close the second discharging circuit path.

In some embodiments, the charge switch unit 130 is included in the charging circuit path. In particular, the charge switch unit 130 can be connected between the node C and the negative electrode charge terminal P− of the battery pack 100. The charge switch unit 130 can also include a metal oxide silicon field effect transistor (MOSFET) controlled by the controller 140 to open or close the charging circuit path.

According to the illustrated embodiment of FIG. 1, the first resistor R1 is included in the common circuit path. In particular, the first resistor R1 has a first end connected to the node D and a second end connected to the node E. The charging current flows through the first resistor R1 during charging of the battery unit 110. In addition, the discharging current (i.e., the current for driving the first electric motor M1) flows through the first resistor R1 during discharging of the battery unit 110. In some embodiments, the node D is connected to an analog front end (AFE) 141 of the controller 140 and may serve as a sensing node for detecting charging/discharging current flowing through the first resistor R1. The controller 140 is configured to detect the amounts of charging current and the discharging current flowing through the first resistor R1 based on a voltage difference detected between the node D and the negative electrode terminal B8− of the battery unit 110. In some embodiments, the first resistor R1 may include a shunt resistor.

In the illustrated embodiment of FIG. 1, the second resistor R2 is further included in the second discharging circuit path. In particular, the second resistor R2 has a first end connected to the node G and a second end connected to node E (which may be connected a common ground). Accordingly, the discharging current flows through the second resistor R2 during discharging of the battery unit 110. Here, the node G may serve as a sensing node for detecting discharging current flowing through the second resistor R2. The MCU 143 detects the amounts of discharging current flowing through the second resistor R2 based on a voltage difference detected between the node G and the negative electrode terminal B8− of the battery unit 110.

Figure 2:
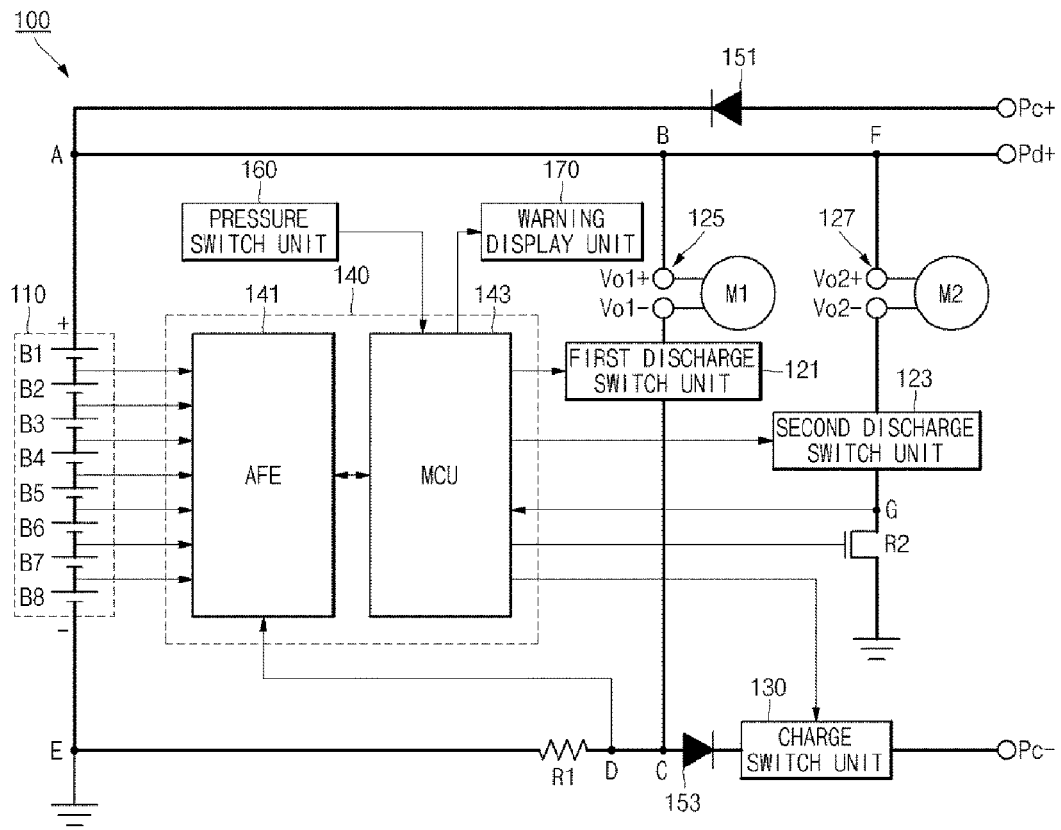

FIG. 2 illustrates, by way of an example, an embodiment in which R2 operates as a shunt resistor to shunt a current through the second discharging circuit path. In the embodiment of FIG. 2, which is similar to the embodiment of FIG. 1 except for the second resistor R2, the second resistor R2 includes a field effect transistor (FET). When the second resistor R2 includes a FET, the FET can be configured to operate as a shunt resistor across a channel between a source and a drain of the FET where the channel is controlled by a gate. Referring to FIG. 2, a first terminal (e.g., a drain terminal) of the FET is connected to the node G, a second terminal (e.g., a source terminal) of the FET is connected to the negative electrode terminal B8− of the battery unit 110 via the node E (which may be at ground), and a gate terminal is connected to a microcomputer unit (MCU) 143 of the controller 140. The operation of the second resistor R2 including the FET may be controlled through the MCU 143 connected to the gate terminal. In this configuration, the MCU 143 detects the amounts of discharging current flowing through the second resistor R2 based on a voltage difference detected between the node G and the voltage of the negative electrode terminal B8− of the battery unit 110. A person skilled in the art will understand that while the example of FIG. 2 illustrated R2 operating as a shunt resistor, R1 can also include a FET to operate as a shunt resistor in substantially similar manner.

According to one embodiment of the battery pack 100, the controller 140 of the battery pack 100 include an analog front end (AFE) and a micro-computer unit (MCU).

In one aspect, the AFE is configured to detect the voltage across the battery unit 110 and perform cell balancing at the same time. Information about the detected voltage may be transmitted to an analog digital convertor (ADC) of the MCU. In addition, the AFE is connected to the node D on the common circuit path to sense the charging current and the discharging current flowing through the first resistor R1 during charging and discharging of the battery unit 110, respectively. Here, the AFE may convert the charging/discharging current into a digital value by the ADC and may transmit the digital value to the MCU.

In another aspect, the MCU is configured to communicate with the AFE and supply charging/discharging control signal and a balancing control signal to the AFE. In addition, the MCU is configured to control operations of the first and second discharge switch units 121 and 123. For example, the MCU may output a control signal to turn on the first and second discharge switch units 121 and 123 in a discharge mode of the battery unit 110 by short-circuiting the first and second discharging circuit paths, respectively, and to turn off the charge switch unit 130 by open-circuiting the charging circuit path. In an analogous manner, the MCU may also output a control signal to turn off the first and second discharge switch units 121 and 123 in a charge mode of the battery unit 110 by open-circuiting the first and second discharging circuit paths, respectively, and to turn on the charge switch unit 130 by short-circuiting the charging circuit.

In addition, the MCU may control a pulse width modulation (PWM) duty ratio of the control signal based on a detected voltage across the battery unit 110, transmitted from the AFE. For example, when the voltage across the battery unit 110 is reduced in the discharge mode, the MCU may increase the PWM duty ratio of the control signal to increase an average amount of current output from the first and second electric motors M1 and M2. Here, the MCU detects from the node D a change in an amount of the discharging current flowing through the first resistor R1, and in response, controls the PWM duty ratio of the control signal to supply a substantially constant amount of average power to the first and second electric motors M1 and M2. A person having ordinary skill in the art will understand that because PWM utilizes electrical pulses, while the power at any given moment may not be constant, a time average of power over a number of duty cycles can be substantially constant.

As an illustration, when the voltage across the battery unit 110 is reduced, power outputs of the first and second electric motors M1 and M2 are reduced, so that rotary power of the first and second electric motors M1 and M2 is reduced. In this case, the controller 140 controls the PWM duty ratio of the first and second discharge switch units 121 and 123 to increase the amount of output current to supply a substantially constant amount of power to the first and second discharge switch units 121 and 123 by monitoring the discharging current flowing through the first resistor R1.

According to one embodiment of the battery pack 100, the voltage drop diode 151 is connected between the positive electrode charge terminal Pc+ of the battery pack 100 and the node A at the same potential as the positive electrode terminal B1+ of the battery unit 110. The voltage drop diode 151 is configured to provide a rated voltage to the battery unit 110 by dropping a diode voltage across the voltage drop diode 151 during charging of the battery unit 110. For example, when the voltage supplied between the positive electrode charge terminal Pc+ and the negative electrode charge terminal P− through an external charging device is higher than the rated voltage of the battery unit 110, the voltage supplied to the battery unit 110 may be reduced to the desired rated voltage by dropping a diode voltage across the voltage drop diode 151. The amount of voltage reduction can be increased by using an appropriate number of voltage drop diodes. For example, if a diode voltage is 1V and the supplied voltage is 2V higher than the rated voltage, two voltage drop diodes 151 can be connected in series to reduce the voltage delivered to the battery unit 110 by 2V. By using an appropriate number of voltage drop diodes 151 instead of a DC-DC converter, the manufacturing cost may be reduced.

According to another embodiment of the battery pack 100, the reverse current preventing diode 153 may prevent current from flowing from the negative electrode charge terminal P− of the battery pack 100 to the first resistor R1 during discharging of the battery unit 110. In particular, the reverse current preventing diode is connected between the negative electrode charge terminal P− and the first resistor R1 and configured such that when a current flows in a direction from the negative electrode charge terminal P− towards the negative electrode terminal B8− of the battery unit 110, the reverse current preventing diode is reverse-biased to prevent a substantial current flow through the first resistor R1 and the battery unit 110.

According to another embodiment of the battery pack 100, the pressure switch unit 160 may be turned on in response to an externally applied pressure. Here, the MCU 143 may sense whether the pressure switch unit 160 is turned on or not, and may output a control signal according to the sensing result to the warning display unit 170. The warning display unit 170 may include a plurality of light emitting diodes (LEDs) and may receive the control signal from the MCU 143 to display a warning.

For example, in a case where the battery pack 100 is employed in a cleaner, if foreign materials exceeding a predetermined amount are amassed in a dust can of the cleaner, a pressure corresponding to the amassed foreign materials is generated. The pressure is applied to the pressure switch unit 160, thereby displaying the warning on the warning display unit 170.

Hereinafter, charge/discharge controlling methods of a battery pack (100) according to an embodiment of the present invention will be described.

Figure 3:
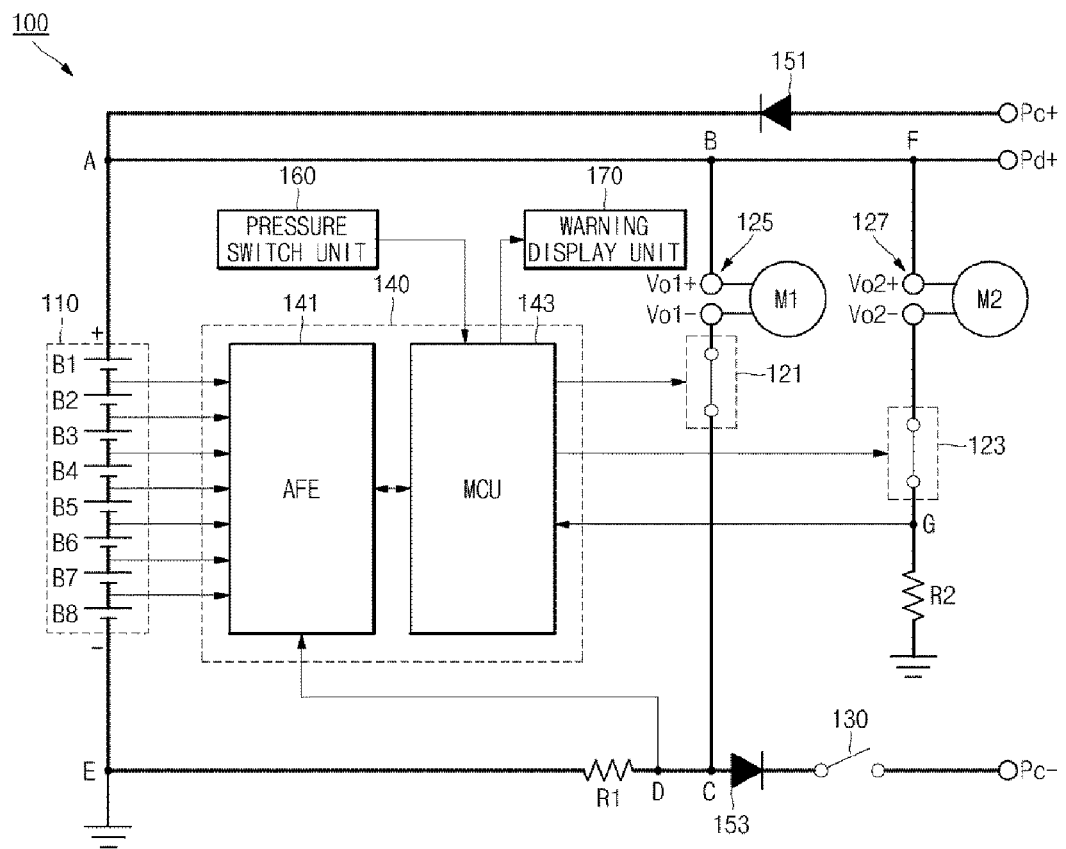
FIG. 3 is a circuit view of a discharging battery pack according to another embodiment of the present invention.

FIG. 3 illustrates a circuit view of a discharging battery pack according to another embodiment of the present invention.

In a discharge mode of the battery pack 100, the controller 140 turns on the first and second discharge switch units 121 and 123 and turns off the charge switch unit 130 to allow discharging current to flow through a first discharging circuit path including a circuit path from the positive electrode terminal B1+ of the battery unit 110 to the negative electrode terminal B8− of the battery unit 110 through nodes A, B, C, D and E (which may be at ground), and a second discharging circuit path including a circuit path from the positive electrode terminal B1+ of the battery unit 110 to the negative electrode terminal B8− of the battery unit 110 through nodes A, B, F, G and E. Accordingly, power may be supplied to the first and second electric motors M1 and M2 connected to first positive and negative terminals Vo1+ and Vo1− of the first output terminal unit 125 and second positive and negative terminals Vo2+ and Vo2− of the second output terminal unit 127, respectively.

The controller 140 may detect the voltage across the battery unit 110 and the discharging current flowing through each of the first and second resistors R1 and R2, and may increase a PWM duty ratio of control signals applied to the first and second discharge switch units 121 and 123 when the voltage of the battery unit 110 is reduced. Accordingly, the amounts of the current output from the first output terminal units Vo1+ and Vo1− and the second output terminal units Vo2+ and Vo2− may increase. Here, the controller 140 may control the PWM duty ratio of control signals to allow a substantially constant amount of power to be supplied to the first and second discharge switch units 121 and 123 based on the discharging current detected through the first and second resistors R1 and R2.

Figure 4:
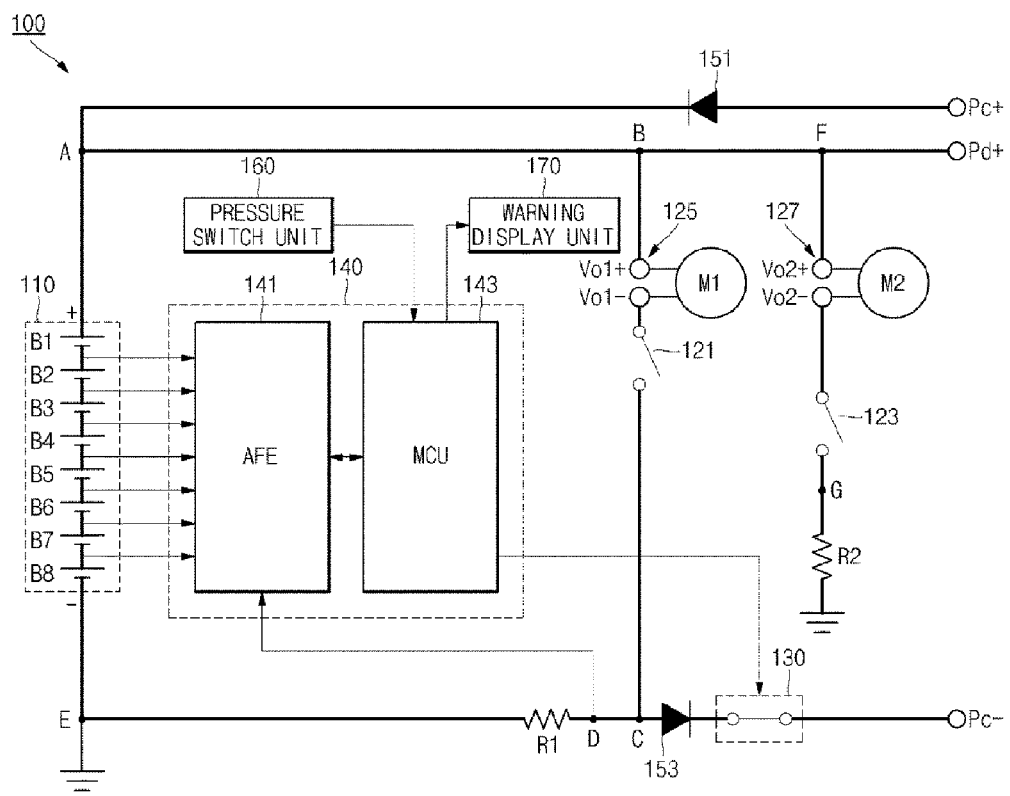
FIG. 4 is a circuit view of a charging battery pack according to another embodiment of the present invention.

FIG. 4 illustrates a circuit view of a charging battery pack according to another embodiment of the present invention.

In a charge mode of the battery pack 100, the controller 140 turns on the charge switch unit 130 and turns off the first and second discharge switch units 121 and 123 to allow charging current to flow through a charging circuit path including a circuit path from the positive electrode charge terminal Pc+ to the negative electrode charge terminal P− through the node A, the battery unit 110, and nodes E, D and C.

The controller 140 may detect charging current flowing through the first resistor 140 and may detect whether overcurrent flows through the battery unit 110, thereby controlling protecting operations of the battery management system. Since the over-current preventing operation of the battery management system is publicly known in the related art, and detailed descriptions thereof will be omitted.

In the conventional battery management system, sensor resistors are installed in a controller part of an electric motor and a battery pack part to detect charging current and discharging current of battery. By contrast, in the battery management system according to the embodiment of the present invention, a single resistor is in a common circuit path shared by a charging circuit path and a discharging circuit path, thereby manufacturing cost of the battery pack 100.

In addition, unlike the conventional battery pack, the battery pack 100 according to the embodiment of the present invention is controlled by an electric motor without using a separate controller, thereby obviating the need of a communication unit between the battery pack and the electric motor, thereby reducing the manufacturing cost of the device incorporating the battery pack.

Although a battery management system and a battery pack having the same according to an exemplary embodiment of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A battery management system comprising:
    a charge/discharge circuit electrically connected to a battery and comprising a charging circuit path, a discharging circuit path, and a common circuit path shared by the charging circuit path and the discharging circuit path;
    an output terminal unit including a positive terminal and a negative terminal in the discharging circuit path, the positive terminal and the negative terminal being electrically connected to each other through an electric motor;
    a discharge switch unit in the discharging circuit path and configured to control a current flow through the discharging circuit path by open-circuiting or short-circuiting the discharging circuit path;
    a charge switch unit in the charging circuit path and configured to control a current flow through the charging circuit path by open-circuiting or close-circuiting the charging circuit path;
    a first resistor in the common circuit path; and
    a controller configured to detect a voltage across the battery and to detect a current flow through the first resistor during charging and discharging of the battery by controlling the discharge switch unit and the charge switch unit, the controller further configured to control an amount of the current flow through the first resistor in response to a change in the voltage across the battery by controlling a pulse width modulation (PWM) duty ratio of the discharge switch unit to supply a substantially constant amount of power to the electric motor.

2. The battery management system of claim 1, wherein the first resistor includes a shunt resistor.

3. The battery management system of claim 1, wherein the discharging circuit path includes a first discharging circuit path and a second discharging circuit path, and the output terminal unit includes a first output terminal unit including a first positive terminal and a first negative terminal in the first discharging circuit path and a second output terminal unit including a second positive terminal and a second negative terminal in the second discharging circuit path.

4. The battery management system of claim 3, wherein the discharge switch unit includes a first discharge switch unit in the first discharging circuit path, and a second discharge switch unit in the second discharging circuit path.

5. The battery management system of claim 4, wherein the first resistor is connected between the first discharge switch unit and a negative electrode terminal of the battery, and further comprising a second resistor electrically connected between the second discharge switch unit and the negative electrode terminal of the battery.

6. The battery management system of claim 5, wherein the controller is configured to control an amount of the current flow through the second resistor in response to a change in the voltage across the battery by controlling a pulse width modulation (PWM) duty ratio of the second discharge switch unit to supply a substantially constant amount of power to the electric motor.

7. The battery management system of claim 5, wherein the first resistor is connected between the first discharge switch unit and a negative electrode terminal of the battery, and further including a field effect transistor (FET) configured to operate as a shunt resistor across a channel between a source and a drain and controlled by a gate, the gate being controlled by the controller.

8. The battery management system of claim 5, further comprising a first charge terminal and a second charge terminal, wherein a connection node of the first discharge switch unit and the first resistor is connected to the second charge terminal through the charge switch unit.

9. The battery management system of claim 8, further comprising a voltage drop diode connected between the first charge terminal and a positive electrode terminal of the battery and forward-biased to supply a rated voltage to the battery by a predetermined voltage drop during charging of the battery.

10. A battery pack comprising:
a battery unit including a plurality of batteries;
a charge/discharge circuit electrically connected to the battery unit and comprising a charging circuit path, a discharging circuit path, and a common circuit path shared by the charging circuit path and the discharging circuit path;
an output terminal unit including a positive terminal and a negative terminal in the discharging circuit path, the positive terminal and the negative terminal being electrically connected to each other through an electric motor;
a discharge switch unit in the discharging circuit path and configured to control a current flow through the discharging circuit path by open-circuiting or short-circuiting the discharging circuit path;
a charge switch unit in the charging circuit path and configured to control a current flow through the charging circuit path by open-circuiting or close-circuiting the charging circuit path;
a first resistor in the common circuit path; and
a controller configured to detect a voltage across the battery unit and to detect a current flow through the first resistor during charging and discharging of the battery by controlling the discharge switch unit and the charge switch unit, the controller further configured to control an amount of the current flow through the first resistor in response to a change in the voltage across the battery by controlling a pulse width modulation (PWM) duty ratio of the discharge switch unit to supply a substantially constant amount of power to the electric motor.

11. The battery pack of claim 10, wherein the first resistor includes a shunt resistor.

12. The battery pack of claim 10, wherein the discharging circuit path includes a first discharging circuit path and a second discharging circuit path, and the output terminal unit includes a first output terminal unit including a first positive terminal and a first negative terminal in the first discharging circuit path and a second output terminal unit including a second positive terminal and a second negative terminal in the second discharging circuit path.

13. The battery pack of claim 12, wherein the discharge switch unit includes a first discharge switch unit in the first discharging circuit path, and a second discharge switch unit in the second discharging circuit path.

14. The battery pack of claim 13, wherein the first resistor is connected between the first discharge switch unit and a negative electrode terminal of the battery unit, and further comprises a second resistor electrically connected between the second discharge switch unit and the negative electrode terminal of the battery unit.

15. The battery pack of claim 14, wherein the controller is configured to control an amount of the current flow through the second resistor in response to a reduction in the voltage across the battery by controlling a pulse width modulation (PWM) duty ratio of the second discharge switch unit to supply a substantially constant amount of power to the electric motor.

16. The battery pack of claim 13, wherein the first resistor is connected between the first discharge switch unit and a negative electrode terminal of the battery unit, and further including a field effect transistor (FET) configured to operate as a shunt resistor across a channel between a source and a drain and controlled by a gate, the gate being controlled by the controller.

17. The battery pack of claim 14, further comprising a first charge terminal and a second charge terminal, wherein a connection node of the first discharge switch unit and the first resistor is connected to the second charge terminal through the charge switch unit.

18. The battery pack of claim 17, further comprising at least one voltage drop diode connected between the first charge terminal and a positive electrode terminal of the battery unit and forward-biased to supply a rated voltage to the battery unit by a predetermined voltage drop during charging of the battery.

* * * * *